CROSS REFERENCE

455/6

TX 370-78
X 5371E

2

Feb. 10, 1953 H. O. PETERSON ET AL 2,628,312

RECEIVING STATION ANTENNA DISTRIBUTION SYSTEM

Filed May 24, 1949

Inventors:
HAROLD O. PETERSON, &
BERTRAM A. TREVOR
BY Harry Tunick
ATTORNEY

2628312
OR IN 343/858

Patented Feb. 10, 1953 2,628,312

UNITED STATES PATENT OFFICE 2,628,312

RECEIVING STATION ANTENNA DISTRIBUTION SYSTEM

Harold Olaf Peterson and Bertram A. Trevor, Riverhead, N. Y., assignors to Radio Corporation of America, a corporation of Delaware Application May 24, 1949, Serial No. 95,028

18 Claims. (Cl. 250—33.69)

The invention relates to antenna systems and it particularly pertains to antenna distribution systems for applying currents induced in one or a number of antennas to a varying number of receivers, as required for example in point-to-point communication systems and the like.

One of the problems in a large receiving station is to provide antenna distribution lines within the station so that any receiver at the station can be connected to any available antenna. Frequently several transmissions at different frequencies are received on a single wide band antenna and fed by means of a single transmission line to receivers individually tuned to the transmission frequencies. Due to the varying message loads which may be encountered, it is desirable to be able to connect and disconnect any of the receivers at the station to or from any available antenna at will without affecting operation of any other receivers that may be connected to the antenna in question. In previous systems this has been accomplished by running overhead transmission lines above all of the receivers in the receiving station. This, however, is only partially effective because it is difficult to provide sufficient numbers of overhead transmission line and, in addition, the large number of lines required become cumbersome. Also to prevent losses due to quarter-wave standing wave resonance points on the transmission lines, it has been customary to terminate the end of each line in a resistor, which practice results in a decrease of signal available at the receivers. In a typical case the decrease was found to be 3 or 4 decibels.

It is an object of the invention to provide an antenna distribution system for a receiving station which will permit any receiver in the station to be coupled to any available antenna.

It is another object of the invention to provide an antenna distribution system in which overhead transmission lines are avoided.

It is a further object of the invention to provide an antenna distribution system which affords the maximum signal input to the receivers for a given field strength at the antenna.

It is still another object of the invention to provide a coupling unit for coupling receivers to an antenna transmission line which cannot present a short circuit impedance across the line.

It is still a further object of the invention to provide an antenna distribution system which affords a favorable increase in signal-to-noise ratio.

It is yet a further object of the invention to provide an antenna distribution system wherein the individual receivers may be located at any point in the station without impairment of their efficiency regardless of the location and arrangement of the incoming antenna transmission lines.

These and all other objects which will appear as the specification progresses are attained in a distribution system according to the invention wherein a plurality of receiver connecting terminals are located along each of the open ended receiving transmission lines within a distance of less than a quarter wavelength at the operating frequency of the individual lines and tuned circuits resonant at the operating frequency are employed to couple receivers to the transmission lines while at the same time decoupling the receivers from one another.

In an alternate arrangement, a number of compact coupling units incorporating vacuum tube amplification are located along a short length of the incoming transmission line so that all of the coupling tube units may be plugged into the transmission line at points considerably less than one-quarter wavelength from the end of the line.

The invention will be described with reference to the accompanying drawing forming a part of the specification and in which.

Figures 1, 3:
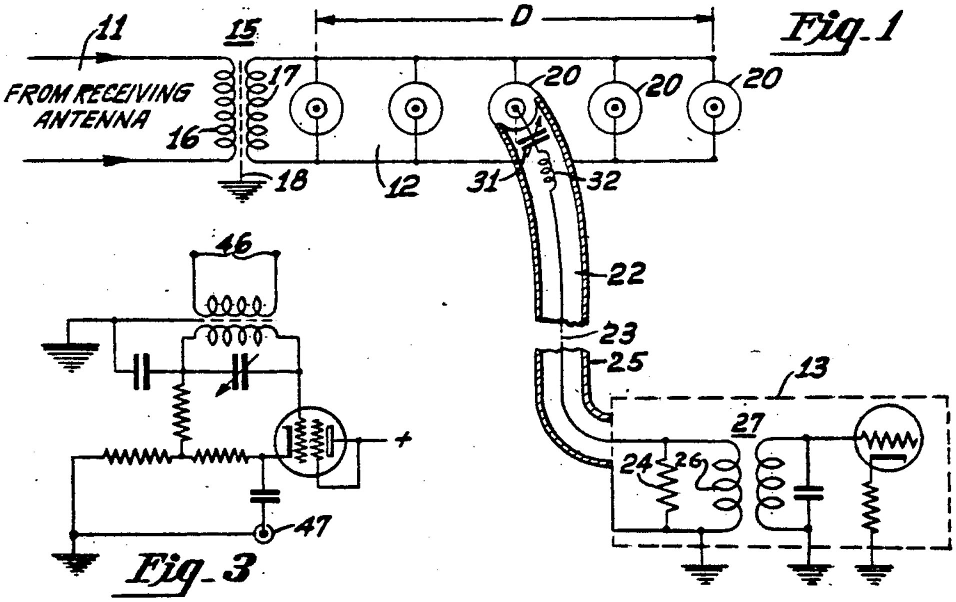
Fig. 1 is a schematic diagram of an embodiment of the invention.
Fig. 3 is a schematic diagram of a coupling unit incorporated in the arrangement of Fig. 2.

Referring to Fig. 1, there is schematically shown a balanced transmission line 11, representative of a number of such transmission lines, which is connected to a receiving antenna (not shown) and a short length of further open ended line 12, again representative of a number of such further lines, to which one or more receivers, of which only receiver 13 is shown, are to be connected. The antennas may be of any type desired, and are not shown as the antennas themselves form no part of the invention. Preferably, it is desired to connect receiver 13 to transmission line 12 by means of a coaxial transmission line 22 and since the usual receiving antenna transmission line is of relatively high characteristic impedance as compared to the usual coaxial transmission lines, an impedance matching transformer 15 is interposed between transmission line 11 and further line 12. Transformer 15 has a primary winding 16 connected to line 11 and a secondary winding 17 connected to line 12, the turns ratio being such that transmission line 11 is terminated by its characteristic impedance. A Farraday screen 18 is preferably interposed between windings 16 and 17 to eliminate or reduce static disturbance and the like. A number of coaxial cable connectors 20 having complementary terminals are provided along line 12 within a distance D which is considerably less than a quarter wavelength at the operating frequency in order to eliminate the problems imposed by making connections of the order of a quarter wavelength apart. A length of coaxial transmission cable 22 having inner conductor 23 and a sheath 25 is employed in patch-cord fashion to couple receiver 13 to connector 20. Cable 22 may be of any desired length, it being an important feature of the invention that the receiver be located anywhere in the station. Cable 22 is terminated at receiver 13 by a resistor 24 having a resistance value substantially equal to the characteristic impedance of cable 22 across which the primary winding 26 of radio frequency transformer 27 is coupled. The presence of resistor 24 prevents cable 22 from ever presenting a short circuit impedance across line 12 and through the intermediary of a series tuned circuit comprising capacitor 31 and inductor 32 interposed in series with the inner conductor 23 of cable 22 near the line end, the impedance of the cable appears across the antenna bus only at the frequency to which the receiver and series resonant circuit are tuned. Thus, if the individual signals received are fairly well separated in frequency, the different receivers will not appreciably reduce the available energy among themselves.

Figure 2:
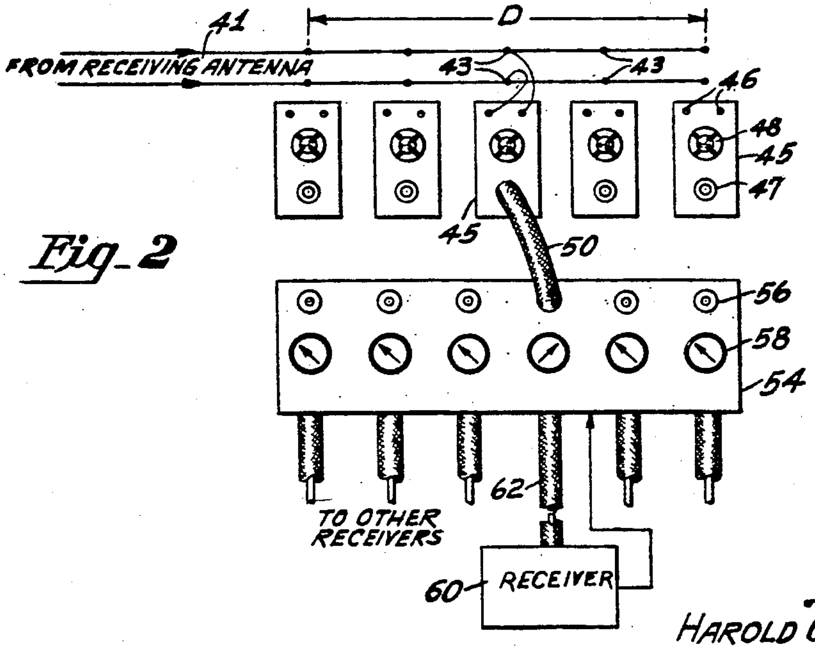
Fig. 2 is a schematic diagram of another embodiment of the invention.

Referring to Figs. 2 and 3, there is shown an alternate embodiment of the invention in which tuned circuits at the antenna distribution terminal also include the grid circuits of coupling tubes, for example, an input circuit as shown in Fig. 3. Referring particularly to Fig. 2, a balanced transmission line 41 connected to a receiving antenna (not shown) is connected to a number of jack terminals 43 located within a distance D which, as in the arrangement of Fig. 1, is considerably less than a quarter wave-length at the operating frequency of the antenna, to which coupling units 45 having balanced inputs can be plugged so that quarter-wave impedance effects in the transmission line do not become a problem. Each coupling unit 45 is provided with a coaxial output jack 47 by means of which the unit may be patched by a coaxial patch-cord 50 through a switching panel 54 to any receiver 60 in the station.

When it is desired to patch a given receiver, for example, receiver 60, into a given antenna, the indicated coaxial line 62 from the receiver to the antenna switching panel 54 is connected to the coaxial output jack 47 of one of the available coupling units 45 through a coaxial patch cord 50. The input of coupling unit 45 is then connected to radio frequency transmission line 41 and the input circuit of the coupling unit is tuned to the desired signal. Remote indicating meters 58 at the antenna switching panel 54 serve to indicate the signal strength at the receiver, thus facilitating the tuning of the coupling unit. As another alternative, the circuit at the coupling unit 45 could be remotely tuned from the receiver 60 by means of some known form of remote control device.

Coupling unit 45 may be constructed in many forms, that shown in Fig. 3 being a preferred narrow band circuit which is readily adaptable for use in individual coupling units. As indicated, the coupling unit has a vacuum tube 70 operating as a triode with a cathode follower output. It is understood that this coupling tube could of course be operated as a pentode with the output derived in known manner from an impedance in the anode circuit if desired.

Since the input of the coupling unit is tuned to the desired signal, the intermodulation problems are no worse than in the present receivers. This arrangement will, however, prevent a loss of three or four decibels presently suffered because of the conventional terminating resistor at the end of the line, and coupled with the proper choice of tube for the coupling unit, it will be possible to obtain a signal-to-noise factor several decibels higher than heretofore obtainable. With the arrangement according to the invention, the intermodulation problem is much easier to handle than when using the conventional wide band intermodulation coupler. The arrangement of Fig. 3 also makes it possible to operate more receivers on a given antenna than is presently possible, and the centralized switching system will afford complete flexibility of antenna availability. In the arrangements described, but one tuning adjustment is made at the antenna switching panel, whch permits a flexibility of station installation with respect to the coordination of tuning between the receiver and the coupling unit. For instance, a meter operated by the receiver output can be located at the antenna switching panel to indicate the condition of maximum signal strength at the receiver as shown in Fig. 2 or the tuned circuits at the antenna switching panel can be remotely controlled from the receiver.

A large receiving station would, of course, require a rather large number of antenna coupling units whereby the coupling unit design shown is advantageous since it involves but few components which can be arranged within very compact physical dimensions.

It may be expedient to apply power to only those coupling units which are actually feeding receivers, which object may be readily attained by providing added circuitry mechanically controlled by the insertion and removal of patch-cords 50.

While the invention has been described in terms of express embodiments, it is to be understood that obvious modifications thereof will be suggested to those skilled in the art without departing from the spirit and scope of the invention.

The invention claimed is:

1. An antenna distribution system including at least one open-ended transmission line connected to an antenna, means to connect a plurality of radio frequency transducers to said transmission line, said transmission line having a plurality of jack terminals connected thereto and spaced along the length thereof, the spacing between the first and the last of said terminals being substantially less than a quarter wavelength of the operating frequency of said transmission line, further transmission lines in the form of coaxial cables having inner conductors and sheath conductors, each of said further lines having plugs thereon adapted to be inserted in any one of said jack terminals, each of said cables being terminated by resistors having resistance values equal to the characteristic impedance value of its associated cable, said transducers being coupled across said resistors, and a series circuit comprising effective capacitive and inductive reactance elements interposed in the inner conductor of each of said coaxial cables and tuned to series resonance at a desired operating frequency.

2. An antenna distribution system including an open-ended transmission line over which a number of received signals separated in frequency are transmitted, a number of terminals successively spaced along said transmission line, the spacing between the first and last of said terminals being substantially less than a quarter wavelength at the highest of said frequencies, a number of receivers individually tuned to one of said signals, each of said receivers having individual transmission lines connected thereto and extending to a position near said terminals, means to couple said individual transmission lines to said terminals and to prevent intercoupling of said receivers, said means including coupling circuits interposed between said terminals and said individual transmission lines and tuned to the frequency of the signal to which the associated receiver responds.

3. An antenna distribution system including an open-ended transmission line over which a number of received signals separated in frequency are transmitted, a number of terminals successively spaced along said transmission line, the spacing between the first and last of said terminals being substantially less than a quarter wavelength at the highest of said frequencies, a number of receivers individually tuned to one of said signals, each of said receivers having individual transmission lines connected thereto and extending to a position near said terminals, means to couple said individual transmission lines to said terminals and to prevent intercoupling of said receivers, said means including series circuits comprising a capacitor and an inductor interposed between said terminals and said individual transmission lines and tuned to the frequency of the signal to which the associated receiver responds.

4. An antenna distribution system including an open-ended transmission line over which a number of received signals separated in frequency are transmitted, a number of terminals successively spaced along said transmission line, the spacing between the first and last of said terminals being substantially less than a quarter wavelength at the highest of said frequencies, a number of receivers individually tuned to one of said signals, each of said receivers having individual transmission lines connected thereto and extending to a position near said terminals, means to couple said individual transmission lines to said terminals and to prevent intercoupling of said receivers, said means including tuned amplifying circuits interposed between said terminals and said individual transmission lines and resonant to the frequency of the signal to which the associated receiver responds.

5. An antenna distribution system including an open-ended transmission line of given characteristic impedance, means to couple said transmission line to an antenna for receiving signals, a number of terminals successively spaced along said section of line, the spacing between the first and last of said terminals being substantially less than a quarter wavelength at the desired operating frequency, a length of twin conductor transmission line, means to connect said length of transmission line to said terminals, said twin conductor line being terminated by a resistor having a resistance value substantially equal to the characteristic impedance of said line, means to connect receiving apparatus across said resistor, and a series tuned circuit in said twin conductor line to present the impedance of said twin conductor line across said transmission line only at the frequency to which said receiving apparatus responds.

6. An antenna distribution system including a balanced transmission line of given characteristic impedance, means to connect said transmission line to an antenna for receiving signals, a further section of an open-ended transmission line having a stated characteristic impedance, a transformer coupling said balanced transmission line to said section of line and having an impedance ratio matching the same, a number of terminals successively spaced along said section of line, the spacing between the first and last of said terminals being substantially less than a quarter wavelength at the desired operating frequency, a length of coaxial cable having inner and sheath conductors, means at one end of said cable to connect the same to said terminals, said cable being terminated at the other end by a resistor having a resistance value substantially equal to the characteristic impedance of said cable, means to connect receiving apparatus across said resistor, and a tuned circuit interposed in the inner conductor of said cable to present the impedance of said cable across said transmission line only at the frequency to which said receiving apparatus responds.

7. An antenna distribution system including a balanced transmission line of given characteristic impedance, means to connect said transmission line to an antenna for receiving signals, a further section of an open-ended transmission line having a stated characteristic impedance, a transformer coupling said balanced transmission line to said section of line and having an impedance ratio matching the same, a number of coaxial cable jacks successively spaced along said section of line, the spacing between the first and last of said terminals being substantially less than a quarter wavelength at the highest desired operating frequency, a length of coaxial cable having inner and sheath conductors, means at one end of said length of cable to connect said cable to said coaxial cable jacks, said cable being terminated at the other end by a resistor having a resistance value substantially equal to the characteristic impedance of said cable, means to connect receiving apparatus across said resistor, and a series tuned circuit comprising a capacitor and an inductor interposed in the inner conductor of said cable near said one end to present the impedance of said cable across said transmission line only at the frequency to which said receiving apparatus responds.

8. An antenna distribution system including at least one balanced transmission line, having a given characteristic impedance, means to connect said transmission line to an antenna for receiving signals, at least one further section of open-ended transmission line having a stated characteristic impedance, a transformer coupling said balanced transmission line to said further section of line and having an impedance ratio matching the same, a number of coaxial cable jacks successively spaced along said further section of line, the spacing between the first and last of said terminals being substantially less than a quarter wavelength at the highest desired operating frequency, lengths of coaxial cable each having inner and sheath conductors, means at one end of said length of coaxial cable to connect said cable to said coaxial cable jacks, said cables being terminated at the other end by resistors having a resistance value substantially equal to the characteristic impedance of the associated cable, means to connect receiving apparatus across said resistors, and a series tuned circuit comprising a capacitor and an inductor interposed in the inner conductor of each cable near said one end to present the impedance of the associated cable across said transmission line only at the frequency to which the associated receiving apparatus responds.

9. An antenna distribution system including at least one open-ended balanced transmission line, means to connect said transmission line to a receiving antenna, said transmission line having a number of terminals connected thereto, the spacing between the first and last of said terminals being substantially less than a quarter wavelength at the highest desired operating frequency, a number of coupling units having tuned circuits, a switching panel having a number of input terminals, means to connect said input terminals to receiving apparatus, means to connect said units across the terminals arranged along said transmission line, means to connect any of said switching panel input terminals to the coupling unit under consideration, means to tune said coupling unit under consideration to resonance at the frequency to which said receiving apparatus responds.

10. An antenna distribution system including at least one open-ended transmission line, means to connect said transmission line to a receiving antenna, said transmission line having a number of pairs of terminals successively spaced therealong, the spacing between the first and last of said pairs being substantially less than a quarter wavelength at the highest desired mean operating frequency, a number of coupling units having tuned circuits, a switching panel having a number of input terminals, means to connect said input terminals to receiving apparatus, means to connect said units across any of said pairs of terminals arranged along said transmission line, means to connect any of said switching panel input terminals to the coupling unit under consideration, the tuned input circuit of said coupling unit being tuned to resonance for the desired operating frequency.

11. An antenna distribution system including an open-ended transmission line connected to a receiving antenna, a number of pairs of terminals successively spaced along said transmission line, the spacing between the first and last of said pairs being substantially less than a quarter wavelength at the desired mean operating frequency, a number of coupling units each having a tuned circuit, a switching panel having a number of input terminals and signal strength indicating instruments, means to connect said input terminals and said instruments to receiving apparatus, means to couple the tuned circuits of said units across any pair of terminals arranged along said balanced transmission line, means to connect any of said switching panel input terminals to the coupling unit under consideration, the tuned circuit of said coupling unit being tuned to a condition of maximum signal strength as shown by the indicating instrument associated with the receiving apparatus under consideration.

12. An antenna distribution system including an open-ended balanced transmission line connected to a receiving antenna, a number of pairs of terminals successively spaced along said transmission line, the spacing between the first and last of said pairs being substantially less than a quarter wavelength at the desired mean operating frequency, a number of coupling units having tuned input circuits, said units having balanced input circuits and unbalanced output circuits, a switching panel having a number of unbalanced input terminals and signal strength indicating instruments, means to connect said input terminals and said instruments to receiving apparatus, means to connect the input circuits of said units across a pair of a said terminals arranged along said balanced transmission line, means to connect any of said switching panel input terminals to the coupling unit under consideration, the tuned input circuit of said coupling unit being tuned to provide an indication of maximum signal strength on the indicating instrument associated with the receiving apparatus under consideration.

13. An antenna distribution system including at least one open-ended balanced transmission line connected to a receiving antenna, a number of pairs of terminals successively spaced along said transmission line, the spacing between the first and last of said pairs being substantially less than a quarter wavelength at the highest desired mean operating frequency for the particular line under consideration, a number of coupling units having tuned input circuits, said units having balanced input circuits and unbalanced output circuits, a switching panel having a number of unbalanced input terminals and signal strength indicating instruments, means to connect said input terminals and said instruments to receiving apparatus, means to connect the input circuits of said units across a pair of terminals arranged along said balanced transmission line, means to connect any of said switching panel input terminals to the coupling unit under consideration, the tuned input circuit of said coupling unit being tuned to resonance as indicated by the indicating instrument associated with the receiving apparatus under consideration.

14. An antenna distribution system including at least one open ended transmission line, and apparatus for coupling a plurality of radio frequency transducers selectively to said transmission line substantially without interaction between the transducers, said apparatus comprising a plurality of coupling units having input and output terminals, means to connect said input terminals across said transmission line, the spacing between the connection of the first and last of said input terminals along said transmission line being substantially less than a quarter wavelength at a desired operating frequency, and means to connect ends of said transducers to any one of said output terminals.

15. An antenna distribution system including an open-ended transmission line, a plurality of sets of complementary terminals spaced along said line, the distance between the first and the last of said sets of terminals being substantially less than a quarter wavelength at the operating frequency, and means to connect transducer apparatus to a plurality of said sets of terminals substantially without interaction, each said means including a two conductor transmission line connected at one end to a given one of said sets of terminals, a resistance element having a resistance value substantially equal to the characteristic impedance of said two conductor transmission line coupled across the end thereof remote from said one end and means to connect a unit of said transducer apparatus across said resistance element.

16. An antenna distribution system including an open-ended transmission line, a plurality of sets of complementary terminals spaced along said line, the distance between the first and the last of said sets of terminals being substantially less than a quarter wavelength at the operating frequency, and means to connect transducer apparatus to a plurality of said sets of terminals substantially without interaction, each said means including a coaxial cable having an inner conductor and an outer sheath and being connected at one end to a given one of said sets of terminals, a resistor having a resistance value substantially equal to the characteristic impedance of said cable connected across the end thereof remote from said one end and means to connect a unit of said transducer apparatus across said resistor.

17. An antenna distribution system including an open-ended transmission line, a plurality of sets of complementary terminals spaced along said line, the distance between the first and the last of said sets of terminals being substantially less than a quarter wavelength at the operating frequency, and means to connect transducer apparatus to a plurality of said sets of terminals substantially without interaction, each said means including a coaxial cable having an inner conductor and an outer sheath and being connected at one end to a given one of said sets of terminals, a circuit comprising a capacitor and an inductor interposed in series in said inner conductor near said one end of said cable, said circuit being tuned to a desired operating frequency, a resistor having a resistance value substantially equal to the characteristic impedance of said twin conductor transmission line connected across the end thereof remote from said one end and means to connect a unit of said transducer apparatus across said resistor.

18. An antenna distribution system including an open-ended transmission line, a plurality of sets of complementary terminals spaced along said line, the distance between the first and the last of said sets of terminals being substantially less than a quarter wavelength at the operating frequency, and means to connect transducer apparatus to a plurality of said sets of terminals substantially without interaction, each said means including two transmission line conductors connected at one end to a given one of said sets of terminals, a resistance element having a resistance value substantially equal to the characteristic impedance of said transmission line conductors coupled across the ends thereof remote from said one end and means to connect a unit of said transducer apparatus across said resistance element.

HAROLD OLAF PETERSON.
BERTRAM A. TREVOR.

REFERENCES CITED

The following references are of record in the file of this patent:

UNITED STATES PATENTS

| Number | Name | Date |
|---|---|---|
| 1,546,878 | Alexanderson | July 21, 1925 |
| 1,835,031 | Espenschied et al. | Dec. 8, 1931 |
| 1,971,235 | Rettenmeyer | Aug. 21, 1934 |
| 2,028,212 | Heising | Jan. 21, 1936 |
| 2,035,545 | Green | Mar. 31, 1936 |
| 2,135,577 | Herbst | Nov. 8, 1938 |
| 2,202,699 | Leeds | May 28, 1940 |
| 2,202,700 | Leeds | May 28, 1940 |
| 2,223,084 | Weissner et al. | Nov. 26, 1940 |
| 2,229,043 | Butler | Jan. 21, 1941 |
| 2,457,123 | Busignies et al. | Dec. 28, 1948 |

FOREIGN PATENTS

| Number | Country | Date |
|---|---|---|
| 436,233 | Great Britain | Oct. 8, 1935 |

OTHER REFERENCES

Practical Analysis of Ultra-High Frequency, by Meagher and Markley, RCA Service Co., Camden, N. J., page 3.